(12) United States Patent
Grimm et al.

(10) Patent No.: US 11,326,070 B2
(45) Date of Patent: May 10, 2022

(54) COATING AGENT COMPOSITION CONTAINING PVC AND PLASTICIZING COMPONENTS (71) Applicant: BASF SE, Ludwigshafen am Rhein (DE)

(72) Inventors: Axel Grimm, Ludwigshafen am Rhein (DE); Matthias Pfeiffer, Ludwigshafen am Rhein (DE); Herbert Morgenstern, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/489,737

(22) PCT Filed: Feb. 28, 2018

(86) PCT No.: PCT/EP2018/054932
§ 371 (c)(1),
(2) Date: Aug. 29, 2019

(87) PCT Pub. No.: WO2018/158316
PCT Pub. Date: Sep. 7, 2018

(65) Prior Publication Data
US 2020/0002563 A1 Jan. 2, 2020

(30) Foreign Application Priority Data
Mar. 1, 2017 (EP) .................................... 17158717

(51) Int. Cl.
C09D 127/06 (2006.01)
D06N 3/06 (2006.01)
C08K 5/00 (2006.01)
C08K 5/12 (2006.01)
C08K 5/3492 (2006.01)

(52) U.S. Cl.
CPC ........... *C09D 127/06* (2013.01); *D06N 3/065* (2013.01); *C08K 5/0008* (2013.01); *C08K 5/12* (2013.01); *C08K 5/34924* (2013.01)

(58) Field of Classification Search
CPC .... C09D 127/09; D06N 3/065; C08K 5/0008; C08K 5/12; C08K 5/34924
See application file for complete search history.

(56) References Cited

U.S. PATENT DOCUMENTS 2,801,244 A 7/1957 Balon
4,255,569 A 3/1981 Müller et al.
4,518,729 A 5/1985 Breidenbach et al.
(Continued)

FOREIGN PATENT DOCUMENTS

EP 0051239 A1 5/1982
RU 2101314 C1 1/1998
(Continued)

OTHER PUBLICATIONS

U.S. Appl. No. 16/071,249, filed Jul. 19, 2018.
U.S. Appl. No. 16/489,731, filed Aug. 29, 2019.
"Benzoate plasticizer for flexible PVC injection moulded toy aplications", Plastics Additives & Compounding, 2001, pp. 30-33.
"Lead-free polymer-based composite materials etc.", SciFinder, American Chemical Society, 2017, pp. 1-11.
(Continued)

*Primary Examiner* — John E Uselding
(74) *Attorney, Agent, or Firm* — Faegre Drinker Biddle & Reath LLP (57) ABSTRACT A coating composition containing
a. polyvinyl chloride
b. one or more compounds of formula (I)

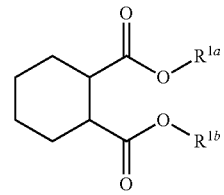

in which
$R^{1a}$ and $R^{1b}$ are $C_7$- to $C_{12}$-alkyl,
c. one or more compounds having plasticizing properties selected from adipates comprising $C_1$- to $C_6$-radicals, glutarates, sebacates, dibenzoates, monobenzoates, compounds of formula (II), compounds of formula (III), phenyl esters of pentadecylsulfonic acid, cresyl esters of pentadecylsulfonic acid, terephthalates, levulinic esters, isosorbitol valerate, trimellitates and 2,2,4-trimethyl-1-3-pentanediol-diisobutyrate,
d. one or more compounds of formula (IV)

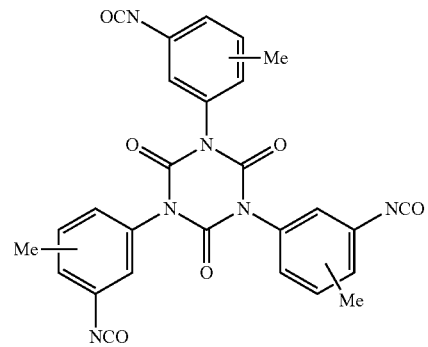

14 Claims, 1 Drawing Sheet

(56) References Cited

U.S. PATENT DOCUMENTS

| | | | |
|---|---|---|---|
| 8,895,650 B2 | 11/2014 | Augustin et al. | |
| 10,030,120 B2 | 7/2018 | Wagner et al. | |
| 2008/0234414 A1* | 9/2008 | Godwin | C08K 5/101 |
| | | | 524/112 |
| 2012/0071598 A1* | 3/2012 | Gosse | C08K 5/0016 |
| | | | 524/143 |
| 2013/0261236 A1* | 10/2013 | Augustin | C08G 18/7621 |
| | | | 524/197 |
| 2013/0317152 A1 | 11/2013 | Becker et al. | |
| 2016/0024273 A1* | 1/2016 | Boppana | C08K 5/103 |
| | | | 521/145 |
| 2017/0044352 A1 | 2/2017 | Storzum et al. | |
| 2017/0145186 A1 | 5/2017 | Pfeiffer et al. | |
| 2017/0145187 A1 | 5/2017 | Pfeiffer et al. | |
| 2018/0282510 A1 | 10/2018 | Pfeiffer et al. | |
| 2018/0282511 A1 | 10/2018 | Pfeiffer et al. | |
| 2018/0291180 A1 | 10/2018 | Pfeiffer et al. | |
| 2019/0048179 A1 | 2/2019 | Pfeiffer et al. | |
| 2019/0055376 A1 | 2/2019 | Pfeiffer et al. | |
| 2019/0161597 A1 | 5/2019 | Pfeiffer et al. | |
| 2019/0161598 A1 | 5/2019 | Pfeiffer et al. | |

FOREIGN PATENT DOCUMENTS

| | | | | |
|---|---|---|---|---|
| RU | 2244728 C1 | 1/2005 | | |
| RU | 2382805 C1 | 2/2010 | | |
| RU | 2533150 C2 | 11/2014 | | |
| RU | 2560165 C2 | 8/2015 | | |
| WO | WO-2012016903 A1 | 2/2012 | | |
| WO | WO-2012069278 A1 | 5/2012 | | |
| WO | WO-2015082676 A1 | 6/2015 | | |
| WO | WO-2015101569 A1 * | 7/2015 | | C08J 3/18 |
| WO | WO-2015162142 A1 | 10/2015 | | |
| WO | WO-2016005357 A1 | 1/2016 | | |
| WO | WO-2016005358 A1 | 1/2016 | | |
| WO | WO-2016137738 A1 | 9/2016 | | |
| WO | WO-2018024591 A1 | 2/2018 | | |
| WO | WO-2018024597 A1 | 2/2018 | | |

OTHER PUBLICATIONS

"Plasticizer composition etc.", SciFinder, American Chemical Society, 2017, pp. 1-32.

European Search Report for European Application No. 17158717.3, dated Aug. 17, 2022.

Guichard, G., "Compounds with Flour and Three Carbon-Heteroatom Bonds", Science of Synthesis, 2005, vol. 18, pp. 771.

Guichard, G., "Compounds with Four and Three Carbon-Heteroatom Bonds", Science of Synthesis, 2005, vol. 18, pp. 773.

Guichard, G., "Compunds with Four and Three Carbon-Heteroatom Bonds", Science of Synthesis, 2005, vol. 18, pp. 770.

Houben, Weyl—Isocyanurate, pp. 1739-1751.

Zoller, A., et al., "Rheometric Study of the Gelation and Fusion Processes of Poly(vinyl chloride-co-vinyl acetate) Plastisols With Different Commercial Plasticizers", Journal Of Vinyl & Additive Technology, 2012, pp. 1-8.

International Search Report for PCT/EP2018/054881 dated May 4, 2018.

International Search Report for PCT/EP2018/054932 dated May 4, 2018.

Written Opinion of the International Searching Authority for PCT/EP2018/054881 dated May 4, 2018.

Written Opinion of the International Searching Authority for PCT/EP2018/054932 dated May 4, 2018.

* cited by examiner

COATING AGENT COMPOSITION CONTAINING PVC AND PLASTICIZING COMPONENTS

CROSS-REFERENCE TO RELATED APPLICATIONS

This application is a national stage application (under 35 U.S.C. § 371) of PCT/EP2018/054932, filed Feb. 28, 2018, which claims benefit of European Application No. 17158717.3, filed Mar. 1, 2017, both of which are incorporated herein by reference in their entirety.

DESCRIPTION

Polyvinyl chloride (PVC) is one of the most commonly produced plastics in terms of quantity. PVC is usually a plastic which is hard and brittle up to about 80° C. and is employed as unplasticized PVC (PVC-U) through addition of thermal stabilizers and other added substances. The addition of plasticizers makes it possible to obtain plasticized PVC (PVC-P) which may be used for many applications where unplasticized PVC is unsuitable.

One application of plasticized PVC is for example the coating of fabric. Plasticized PVC-coated fabrics may include for example tarpaulins, conveyor belts, geomembranes, tent sheets, roof or cladding materials or protective clothing. Historically, these applications have usually employed natural fabrics, such as fabrics made of cotton, linen, silk, wool, hemp or flax. On account of their better properties, such as improved strength, toughness, lightness, moisture-resistance, resistance to microorganisms and/or flexibility, synthetic fabrics are increasingly replacing natural fabrics in the abovementioned applications.

Since synthetic fibers often comprise smooth monofilaments the surface thereof is generally smoother than that of natural fibers. Their smoother surface means that mechanical adhesion of PVC coatings to synthetic fibers is usually reduced. In order to improve the mechanical adhesion of PVC coatings to synthetic fibers the PVC-comprising coating composition, which is generally formulated as a plastisol, is admixed with an adhesion promoter before application to the fiber/to the fabric. Via reactive groups the adhesion promoter produces a chemical bond to the fiber/to the fibers of the fabric and thus results in improved adhesion of the PVC coating to the fiber/to the fabric.

Typically employed adhesion promoters are isocyanurates having free isocyanate groups. Isocyanurates having free isocyanate groups may have two, three, four or more isocyanate groups. Most adhesion promoters generally comprise isocyanurates having three isocyanate groups. Isocyanurates having three isocyanate groups are generally obtained by trimerization of aromatic or aliphatic diisocyanates. Trimerization reactions of aromatic or aliphatic diisocyanates for producing isocyanurates having three isocyanate groups are known to those skilled in the art (see for example U.S. Pat. Nos. 2,801,244; 4,255,569; Guichard G. *Science of Synthesis*, 18 (2005), pp. 771-773; Houben-Weyl, Vol. E 20, pp. 1739-1751).

In order to increase the compatibility of the adhesion promoters with PVC plastisols it is customary to employ adhesion promoters as a constituent of binder compositions.

Thus for example WO 2016/137738 A1 discloses binder compositions for PVC plastisols comprising isocyanurates and organophosphates.

The present invention had for its object to provide an improved PVC-comprising coating composition for fibers or fabrics, in particular synthetic fibers, synthetic fabrics or mixed fabrics. An improved PVC-comprising coating composition has an extended pot life for example. The PVC-comprising coating composition should additionally exhibit a good mechanical adhesion to fibers or fabrics, in particular to synthetic fibers, synthetic fabrics or mixed fabrics.

One measure for an extended pot life is for example an only small increase in plastisol viscosity over a period of up to an hour after addition of the adhesion promoter. One measure for mechanical adhesion to the fabric is for example measurement of the adhesion force according to DIN 2411 (August 2000).

This object is achieved by a coating composition comprising
a) polyvinyl chloride,
b) one or more compounds of general formula (I), in which
$R^{1a}$ and $R^{1b}$ are independently of one another $C_7$- to $C_{12}$-alkyl
c) one or more compounds having plasticizing properties selected from adipates comprising $C_1$- to $C_6$-radicals, glutarates comprising $C_1$- to $C_6$-radicals, sebacates comprising $C_2$- to $C_6$-radicals, dibenzoates, monobenzoates comprising a $C_5$- to $C_{10}$-alkyl radical or benzyl radical,
compounds of general formula (II)

in which $R^{2a}$, $R^{2b}$ and $R^{2c}$ independently of one another and independently of $R^{2d}$ are $C_2$- to $C_6$-alkyl and $R^{2d}$ independently of $R^{2a}$, $R^{2b}$ and $R^{2c}$ is $C_1$- to $C_5$-alkyl, compounds of general formula (III)

in which $R^{3a}$, $R^{3b}$ and $R^{3c}$ are independently of one another $C_2$- to $C_6$-alkyl, phenyl esters of pentadecylsulfonic acid, cresyl esters of pentadecylsulfonic acid, terephthalates comprising $C_1$- to $C_6$-radicals, levulinic esters comprising $C_1$- to $C_6$-radicals, isosorbitol valerate, trimellitates comprising $C_1$- to $C_6$-radicals and 2,2,4-trimethyl-1,3-pentanediol diisobutyrate, d) one or more compounds of general formula (IV).

The present invention further provides a process for coating fabric with the coating composition according to the invention.

The present invention further provides articles comprising fabric that has been at least partially coated with the coating composition according to the invention.

Figure 1:
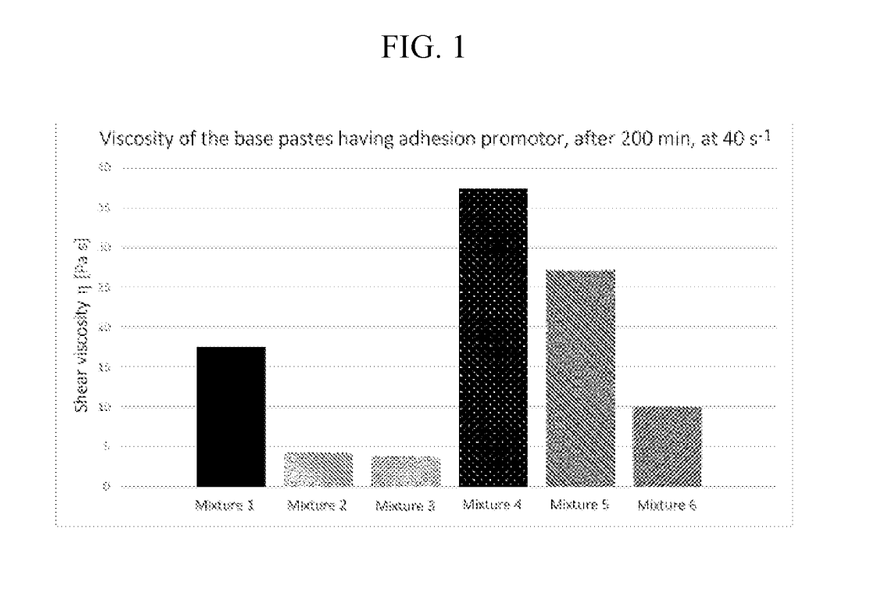
FIG. 1 illustrates the viscosity of the base pastes having adhesion promoter after 200 min, at 40 s$^1$.
Figure 2:
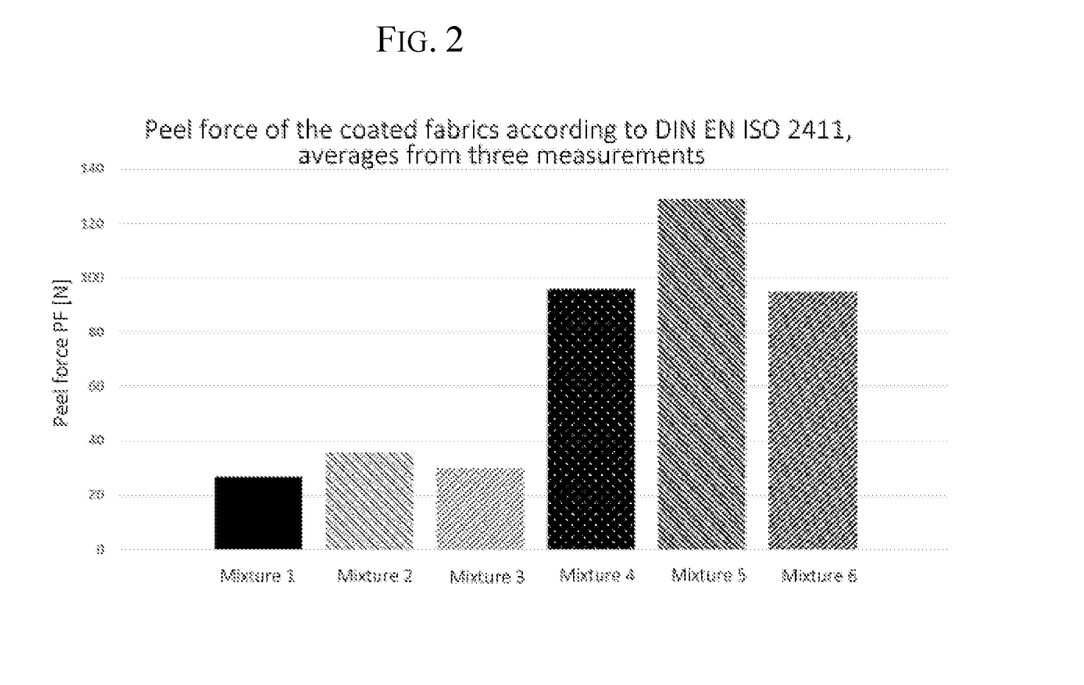
FIG. 2 illustrates the peel force of the coated fabrics.

In the context of the present invention the abbreviation phr (parts per hundred resin) stands for parts by weight per hundred parts by weight of polymer. Polymer here stands for the total amount of polymers present in the coating composition according to the invention. If the coating composition according to the invention comprises polyvinyl chloride as the only polymer, phr is to be understood as meaning per hundred parts by weight of polyvinyl chloride.

In the context of the present invention compounds of general formula (IV) are considered to be adhesion promoters for example.

A plastisol is generally a suspension of finely-powdered polymer in liquid plasticizer, in which the dissolution rate of the polymer in the liquid plasticizer is very low at room temperature. Heating the suspension of finely-powdered polymer in liquid plasticizer forms a substantially homogeneous phase of the polymer and the plasticizer. The individual isolated plastics particles swell and join together to afford a three-dimensional high-viscosity gel. This procedure is generally referred to as gelation and takes place above a certain minimum temperature. This minimum temperature is generally referred to as the gelation or dissolution temperature. Introduction of the heat necessary therefor may be effected via the parameters temperature and/or residence time. The faster the gelation takes place (the indicator here is the dissolution temperature, i.e. the lower this temperature is the faster the plastisol undergoes gelation) the lower the temperature (at a given residence time) or the residence time (at a given temperature) may be selected.

Polyvinyl chloride is available in many different types— different types of polyvinyl chloride may differ in their molecular weights, in their molecular weight distribution, the particle size of the polymer particles, the particle size distribution and/or the surface structure of the polymer particles which for example may be rough or smooth. Different types of polyvinyl chloride can also differ from one another in their degree of chain branching. Polyvinyl chloride may be a homopolymer of vinyl chloride or a copolymer of vinyl chloride and vinyl acetate. Polyvinyl chloride is produced by suspension polymerization or by emulsion polymerization for example. In suspension polymerization the vinyl monomers are generally suspended in water with stirring and under temperature and pressure control. In addition to the vinyl monomers the suspension generally also comprises suspension auxiliaries and initiators. After completion of the polymerization the suspension is worked up by methods known to those skilled in the art. Thus the suspension may be supplied to a stripper to remove unreacted monomers. Finally the suspension may be washed and dried to obtain polyvinyl chloride.

Polyvinyl chloride produced by suspension polymerization generally comprises agglomerated particles of 80 to 200 micrometers in size. Polyvinyl chloride produced by suspension polymerization is generally used for dry blend applications.

The production of polyvinyl chloride by emulsion polymerization is similar to the production of polyvinyl chloride by suspension polymerization. One difference in the production processes is for example that in emulsion polymerization the vinyl monomers are emulsified in water thus resulting in the formation of latex particles. The ratio of water to vinyl monomers is generally greater in emulsion polymerization than in suspension polymerization.

Polyvinyl chloride produced by emulsion polymerization generally comprises agglomerated particles of 15 to 20 micrometers in size. Emulsion polymerization generally affords smaller polyvinyl chloride particles than suspension polymerization. Polyvinyl chloride produced by emulsion polymerization is often used in the production of plastisols. Plastisols thus produced may be employed as coating compositions for example.

Polyvinyl chloride having particle sizes of 1 to 40 micrometers may be produced for example by microsuspension polymerization.

The K value which characterizes the molar mass of the polyvinyl chloride and is determined according to DIN-EN 1628-2 (November 1999) is preferably in the range from 57 to 90, further preferably in the range from 61 to 85 and particularly preferably in the range from 64 to 80 for the polyvinyl chloride employed in the context of the present invention.

The coating composition according to the invention is in the form of a plastisol. It is therefore expedient when the production of the coating composition according to the invention comprises the following steps:

a. suspending polyvinyl chloride in one or more compounds of general formula (I), b. adding one or more compounds of general formula (IV) to the obtained suspension, wherein one or more of the compounds recited under c) having plasticizing properties may be added in step a., or subsequent to step a. and prior to step b., in step b., or subsequent to step b., or at any desired times.

In addition to polyvinyl chloride the coating composition according to the invention may also additionally comprise one or more polymers distinct from polyvinyl chloride.

A polymer distinct from polyvinyl chloride is for example a homo- or copolymer which comprises in polymerized form at least one monomer selected from $C_2$- to $C_{10}$-monoolefins, for example ethylene, propylene, 1,3-butadiene, 2-chloro-1, 3-butadiene, vinyl alcohols or $C_2$- to $C_{10}$-alkyl esters thereof, vinyl acetate, vinyl chloride, vinylidene chloride, vinylidene fluoride, tetrafluoroethylene, glycidyl acrylate, glycidyl methacrylate, acrylates or methacrylates having alcohol components of branched or unbranched $C_1$- to $C_{10}$-alcohols, vinylaromatics, for example styrene, (meth) acrylonitrile, α,β-ethylenically unsaturated mono- or dicarboxylic acids, and maleic anhydride.

A polymer distinct from polyvinyl chloride is also for example polyvinyl ester, polycarbonate, polyether, polyether ketone, thermoplastic polyurethane, polysulfide, polysulfone, polyester, polyalkylene terephthalate, polyhydroxyalkanoate, polybutylene succinate, polybutylene succinate adipate, polyacrylate having identical or different alcohol radicals from the group of $C_4$- to $C_8$-alcohols, such as butanol, hexanol, octanol, 2-ethylhexanol, polymethyl methacrylate, methyl methacrylate-butyl acrylate copolymer, acrylonitrile-butadiene-styrene copolymer, polystyrene, styrene-acrylonitrile copolymer, acrylonitrile-styrene acrylate, styrene-butadiene-methyl methacrylate copolymer, styrene-maleic anhydride copolymer, styrene-methacrylic acid copolymer, polyoxymethylene, polyvinyl alcohol, polyvinyl butyral, polycaprolactone, polycaprolactone, polyhydroxybutyric acid, polyhydroxyvaleric acid, polyhydroxyvaleric acid, polylactic acid, ethyl cellulose, cellulose acetate, cellulose propionate or cellulose acetate/butyrate.

In the case where the coating composition according to the invention additionally comprises not only polyvinyl chloride but also one or more polymers distinct from polyvinyl chloride it is preferable when the weight ratio of polyvinyl chloride to the polymers distinct from polyvinyl chloride is 99:1 to 1:1.

In the case where the coating composition according to the invention comprises not only polyvinyl chloride but also one or more polymers distinct from polyvinyl chloride the reported amounts in phr are to be understood as meaning parts by weight per hundred parts by weight of polymer. Polymer here stands for the total amount of polymers present in the coating composition according to the invention.

In the case where the coating composition according to the invention comprises not only polyvinyl chloride but also one or more polymers distinct from polyvinyl chloride it is certainly expedient for the production of the coating composition according to the invention to comprise the following steps:
  a. suspending all of the polymers present in the coating composition in one or more compounds of general formula (I),
  b. adding one or more compounds of general formula (IV) to the obtained suspension, wherein one or more of the compounds recited under c) having plasticizing properties may be added in step a., or subsequent to step a. and prior to step b., in step b., or subsequent to step b., or at any desired times.

The coating composition according to the invention comprises one or more compounds of general formula (I). Compounds of general formula (I) are commercially available and the production thereof is also known to those skilled in the art (see for example WO 2015/082676).

In a compound of general formula (I) $R^{1a}$ and $R^{1b}$ are independently of one another $C_7$- to $C_{12}$-alkyl. $C_7$- to $C_{12}$-alkyl may be straight-chain or branched. $C_7$- to $C_{12}$-alkyl is for example n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl or n-dodecyl, isododecyl. It is preferable when $R^{1a}$ and $R^{1b}$ independently of one another are $C_8$- to $C_{11}$-alkyl. $C_8$- to $C_{11}$-alkyl may be straight-chain or branched. $C_8$- to $C_{11}$-alkyl is for example n-octyl, n-nonyl, isononyl, 2-ethylhexyl, isodecyl, 2-propylheptyl, n-undecyl or isoundecyl.

Although $R^{1a}$ and $R^{1b}$ are generally independent of one another in a compound of general formula (I) $R^{1a}$ and $R^{1b}$ are preferably identical. It is therefore more preferable when $R^{1a}$ and $R^{1b}$ are identical and are $C_8$- to $C_{11}$-alkyl. It is particularly preferable when $R^{1a}$ and $R^{1b}$ are identical and are isononyl.

A compound of general formula (I) is for example di(n-octyl) 1,2-cyclohexanedicarboxylate, di(isooctyl) 1,2-cyclohexanedicarboxylate, di(2-ethylhexyl) 1,2-cyclohexanedicarboxylate, di(n-nonyl) 1,2-cyclohexanedicarboxylate, di(isononyl) 1,2-cyclohexanedicarboxylate, di(2-propylhexyl) 1,2-cyclohexanedicarboxylate, di(n-decyl) 1,2-cyclohexanedicarboxylate, di(isodecyl) 1,2-cyclohexanedicarboxylate, di(2-propylheptyl) 1,2-cyclohexanedicarboxylate, di(n-undecyl) 1,2-cyclohexanedicarboxylate or di(isoundecyl) 1,2-cyclohexanedicarboxylate. A compound of general formula (I) is preferably di(isooctyl) 1,2-cyclohexanedicarboxylate, di(n-octyl) 1,2-cyclohexanedicarboxylate, di(2-ethylhexyl) 1,2-cyclohexanedicarboxylate, di(n-nonyl) 1,2-cyclohexanedicarboxylate or di(isononyl) 1,2-cyclohexanedicarboxylate. It is more preferable when a compound of general formula (I) is di(isononyl) 1,2-cyclohexanedicarboxylate.

Di(isooctyl) 1,2-cyclohexanedicarboxylate, di(isononyl) 1,2-cyclohexanedicarboxylate, di(isodecyl) 1,2-cyclohexanedicarboxylate, di(isodecyl) 1,2-cyclohexanedicarboxylate or di(isoundecyl) 1,2-cyclohexanedicarboxylate are not single compounds but rather mixtures of different isomers. The precise composition of these isomer mixtures generally depends on the composition of the alcohol isomer mixture employed in the production of these compounds. The composition of the alcohol isomer mixture generally depends on the employed starting compounds and/or the production conditions. WO 2015/082676 discloses for example compositions of possible alcohol isomer mixtures suitable for production of di(isooctyl) 1,2-cyclohexanedicarboxylate, di(isononyl) 1,2-cyclohexanedicarboxylate, di(isodecyl) 1,2-cyclohexanedicarboxylate, di(isodecyl) 1,2-cyclohexanedicarboxylate or di(isoundecyl) 1,2-cyclohexanedicarboxylate dependent on the production conditions and/or the employed starting compounds.

The proportion of one or more compounds of general formula (I) in the coating composition according to the invention is preferably 5 to 150 phr. It is more preferable when the proportion of one or more compounds of general formula (I) is 10 to 120 phr and particularly preferably 20 to 100 phr. The proportion of one or more compounds of general formula (I) in the coating composition according to the invention may be for example 25, 30, 35, 40, 45, 50, 55, 60, 65, 70, 75, 80, 85, 90 or 95 phr.

The coating composition according to the invention contains one or more compounds having plasticizing properties selected from adipates comprising $C_1$- to $C_6$-radicals, glutarates comprising $C_1$- to $C_6$-radicals, sebacates comprising $C_2$- to $C_6$-radicals, dibenzoates, monobenzoates comprising a $C_5$- to $C_{10}$-alkyl radical or a benzyl radical, compounds of general formula (II), compounds of general formula (III), phenyl esters of pentadecylsulfonic acid, cresyl esters of pentadecylsulfonic acid, terephthalates comprising $C_1$- to $C_6$-radicals, lavulinic esters comprising $C_1$- to $C_6$-radicals, isosorbitol valerate, trimellitates comprising $C_1$- to $C_6$-radicals. The coating composition according to the invention may accordingly comprise one or more compounds of general formula (II) or one or more dibenzoates.

Compounds of general formula (II) are commercially available and the production of compounds of general formula (II) is also known to those skilled in the art.

(II)

In a compound of general formula (II) $R^{2a}$, $R^{2b}$ and $R^{2c}$ are independently of one another and independently of $R^{2d}$ $C_2$- to $C_6$-alkyl. $C_2$- to $C_6$-alkyl may be straight-chain or branched. $C_2$- to $C_6$-alkyl is for example ethyl, n-propyl, isopropyl, n-butyl, isobutyl, n-pentyl, 1-methylbutyl, 2-methylbutyl, 3-methylbutyl, n-hexyl, 1-methylpentyl, 2-methylpentyl, 3-methylpentyl, 4-methylpentyl, 1-ethylbutyl, 2-ethylbutyl, 3-ethylbutyl, 1-propylpropyl or 2-propylpropyl. It is preferable when $R^{2a}$, $R^{2b}$ and $R^{2c}$ are independently of one another $C_4$-alkyl. $C_4$-alkyl may be straight-chain or branched. $C_4$-alkyl is for example n-butyl or isobutyl. $R^{2d}$ is independently of $R^{2a}$, $R^{2b}$ and $R^{2c}$ $C_1$- to $C_5$-alkyl. $C_1$- to $C_5$-alkyl may be straight-chain or branched. $C_1$- to $C_5$-alkyl is for example methyl, ethyl, n-propyl, isopropyl, n-butyl, isobutyl, n-pentyl, 1-methylbutyl, 2-methylbutyl or 3-methylbutyl. It is preferable when $R^{2d}$ is $C_1$-alkyl.

Although $R^{2a}$, $R^{2b}$ and $R^2$ are generally independent of one another in a compound of general formula (I) $R^{2a}$, $R^{2b}$ and $R^{2c}$ are preferably identical. It is therefore particularly preferable when $R^{2a}$, $R^{2b}$ and $R^{2c}$ are identical and are $C_4$-alkyl and $R^{2d}$ is $C_1$-alkyl.

A preferred compound of general formula (II) is for example acetyl tri-n-butyl citrate or acetyl triisobutyl citrate.

Compounds of general formula (III) are commercially available and the production of compounds of general formula (III) is also known to those skilled in the art.

(III)

In a compound of general formula (III) $R^{3a}$, $R^{3b}$ and $R^{3c}$ are independently of one another $C_2$- to $C_6$-alkyl. $C_2$- to $C_6$-alkyl can be straight-chain or branched. $C_2$- to $C_6$-alkyl is for example ethyl, n-propyl, isopropyl, n-butyl, isobutyl, n-pentyl, 1-methylbutyl, 2-methylbutyl, 3-methylbutyl, n-hexyl, 1-methylpentyl, 2-methylpentyl, 3-methylpentyl, 4-methylpentyl, 1-ethylbutyl, 2-ethylbutyl, 3-ethylbutyl, 1-propylpropyl or 2-propylpropyl. It is preferable when $R^{3a}$, $R^{3b}$ and $R^{3c}$ are independently of one another $C_4$-alkyl. $C_4$-alkyl can be straight-chain or branched. $C_4$-alkyl is for example n-butyl or isobutyl.

An adipate comprising $C_1$- to $C_6$-radicals may in its side groups independently of one another comprise alkyl chains having 1 to 6 carbon atoms, cyclohexyl groups or benzyl groups.

A glutarate comprising $C_1$- to $C_6$-radicals may in its side groups independently of one another comprise alkyl chains having 1 to 6 carbon atoms, cyclohexyl groups or benzyl groups.

A sebacate comprising $C_2$- to $C_6$-radicals may in its side groups independently of one another comprise alkyl chains having 2 to 6 carbon atoms, cyclohexyl groups or benzyl groups.

A dibenzoate is for example diethylene glycol dibenzoate, triethylene glycol dibenzoate, polyethylene glycol dibenzoate or dipropylene glycol dibenzoate. It is preferable when a dibenzoate is diethylene glycol dibenzoate, triethylene glycol dibenzoate or dipropylene glycol dibenzoate. Dipropylene glycol dibenzoate may be one compound or an isomer mixture. Dipropylene glycol dibenzoate is generally an isomer mixture containing all constitutional isomers.

In a monobenzoate comprising $C_5$- to $C_{10}$-alkyl radicals the alkyl chain may be linear or branched. A monoalkyl benzoate is for example isononyl benzoate, isodecyl benzoate, or 2-propylheptyl benzoate. Isononyl benzoate or isodecyl benzoate are not single compounds but rather isomer mixtures. The composition of the isomer mixtures depends on the isomer composition of the alcohol isomer mixture employed in the production of the two compounds. Compositions of alcohol isomer mixtures employable for producing isononyl benzoate or isodecyl benzoate are disclosed for example in WO 2015/082676.

A terepthalate comprising $C_1$- to $C_6$-radicals may in its side groups independently of one another comprise alkyl chains having 1 to 6 carbon atoms, cyclohexyl groups or benzyl groups. Such a terepthalate is for example di-n-butyl terephthalate or diisobutyl terephthalate.

A levulinic ester comprising $C_1$- to $C_6$-radicals may in its side groups independently of one another comprise alkyl chains having 1 to 6 carbon atoms, cyclohexyl groups or benzyl groups.

A trimellitate comprising $C_1$- to $C_6$-radicals may in its side groups independently of one another comprise alkyl chains having 1 to 6 carbon atoms, cyclohexyl groups or benzyl groups. A trialkyl trimellitate is for example tri-n-butyl trimellitate or diisobutyl trimellitate.

In the context of the present invention it is preferable when the coating composition according to the invention comprises one or more compounds of general formula (II) or one or more dibenzoates. It is particularly preferable when the coating composition according to the invention comprises acetyl tri-n-butyl citrate, acetyl triisobutyl citrate or any desired mixture thereof.

It is also particularly preferred when the coating composition according to the invention comprises diethylene glycol dibenzoate, triethylene glycol dibenzoate, dipropylene glycol dibenzoate or any desired mixture thereof, for example a mixture comprising diethylene glycol dibenzoate, triethylene glycol dibenzoate and dipropylene glycol dibenzoate.

The proportion of one or more of the recited compounds having plasticizing properties in the coating composition according to the invention is preferably 5 to 150 phr, more preferably 10 to 120 phr and particularly preferably 20 to 100 phr. The proportion of one or more of the recited compounds having plasticizing properties in the coating composition according to the invention may thus be for example 25, 30, 35, 40, 45, 50, 55, 60, 65, 70, 75, 80, 85, 90 or 100 phr.

The total proportion of one or more compounds of general formula (I) and the total proportion of one or more of the recited compounds having plasticizing properties is in total preferably 10 to 155 phr, more preferably 20 to 130 phr and particularly preferably 40 to 120 phr. Thus the total may be for example 45, 50, 55, 60, 65, 70, 75, 80, 85, 90, 95, 100, 105, 110 or 115 phr.

The coating composition according to the invention comprises one or more compounds of general formula (IV).

(IV)

Compounds of general formula (IV) are commercially available and the production of compounds of general formula (IV) is also known to those skilled in the art. Compounds of general formula (IV) are generally produced by trimerization of diisocyanates in the presence of appropriate catalysts (see for example U.S. Pat. Nos. 2,801,244; 4,255,569; Guichard G. Science of Synthesis, 18 (2005), pp. 771-773; Houben-Weyl, Vol. E 20, pp. 1739-1751, WO 2016/137738 A1). Usually employed as diisocyanates for this purpose are isomer mixtures containing primarily tolylene 2,4-diisocyanate (2,4-TDI) and tolylene 2,6-diisocyanate (2,6-TDI). However it is also possible to produce compounds of general formula (IV) merely from 2,4-TDI.

The proportion of one or more compounds of general formula (IV) in the coating composition according to the invention is preferably 0.1 to 10 phr. It is more preferable when the proportion of one or more compounds of general formula (IV) is 0.5 to 8 phr and particularly preferably 1 to 6 phr. The proportion of one or more compounds of general formula (IV) in the coating composition according to the invention may thus be for example 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6 or 5.8 phr.

In addition to compounds of general formula (IV) the coating composition according to the invention may also further comprise one or more isocyanurates obtained by trimerization of other isocyanates. Other isocyanates that may be utilized in the production of isocyanurates are for example p-phenylene diisocyanate, m-phenylene diisocyanate, 1-methoxyphenylene-2,4-diisocyanate, 3,3-dimethylene-4,4'-diisocyanatodiphenylmethane, diphenylene-4,4'-diisocyanate, 4,4'-diisocyanatodiphenyl ether, naphthalene 1,5-diisocyanate, hexamethylene diisocyanate, diisocyanatodicyclohexylmethane, p-xylene diisocyanate, m-xylene diisocyanate, isocyanatobenzyl isocyanate, 1,2,3,4,5,6-hexahydrodiphenylene 4,4'-diisocyanate, 4,4'-diisocyanato-1,2,3,4,5,6-hexahydrodiphenylmethane, 1,2,3,4-tetrahydronaphthylene 1,5-diisocyanate, tolylene 2,4,6-triisocyanate, 3-methyl-4,6,4'-triisocyanatodiphenylmethane, 2,4,4'-triisocyanatobiphenyl, 2,4,4'-triisocyanatobiphenyl ether, 4,4'-diisocyanatodiphenylmethane, 1-chlorophenylene 2,4-diisocyanate, p-isocyanatobenzyl isocyanate or any desired mixtures thereof.

The proportion of one or more isocyanurates obtained by trimerization of other isocyanates that may additionally be present in the coating composition according to the invention is preferably 0 to 10 phr, more preferably 0 to 8 phr and particularly preferably 0 to 6 phr. Thus the proportion may be for example 0.5, 1, 1.5, 2, 2.5, 3, 3.5, 4, 4.5, 5 or 5.5 phr.

When the coating composition additionally contains not only one or more compounds of general formula (IV) but also further isocyanurates obtained by trimerization of other isocyanates the total proportion of isocyanurates in the coating composition according to the invention is thus preferably more than 0.1 to 10.1 phr, more preferably more than 0.5 to 8.5 phr and particularly preferably more than 1 to 7 phr.

The coating composition according to the invention may also comprise small amounts of diisocyanates. The diisocyanates present in the coating composition according to the invention may be the diisocyanates used for producing the isocyanurates present in the coating composition for example.

The coating composition may additionally also comprise one or more further compounds distinct from compounds of general formula (I), the recited compounds having plasticizing properties and compounds of general formula (IV). Such a further compound is for example a dialkyl terephthalate having in its alkyl chains independently of one another 7 to 13 carbon atoms, a dialkyl adipate having in its alkyl chains independently of one another 7 to 13 carbon atoms or a tetraester of pentaerythritol.

A dialkyl terephthalate having in its alkyl chains independently of one another 7 to 13 carbon atoms is for example di(2-ethylhexyl) terephthalate. A dialkyl adipate having in its alkyl chains independently of one another 7 to 13 carbon atoms is for example di(2-ethylhexyl) adipate.

A tetraester of pentaerythritol is for example pentaerythritol whose alcohol groups have been esterified with valeric acid.

Di(2-ethylhexyl) terephthalate, di(2-ethylhexyl) adipate, pentaerythritol esterified with valeric acid or any desired mixture thereof is preferably present in the coating composition according to the invention in a proportion of 0 to 145 phr, wherein the total proportion of one or more compounds of general formula (I), di(2-ethylhexyl) terephthalate, di(2-ethylhexyl) adipate, pentaerythritol esterified with valeric acid or any desired mixture thereof is not more than 150 phr. Thus the proportion of di(2-ethylhexyl) terephthalate, di(2-ethylhexyl) adipate, pentaerythritol esterified with valeric acid or any desired mixture thereof is for example 5, 10, 15, 20, 25, 30, 35, 50, 55, 60, 65, 70, 75, 80, 85, 90, 95, 100, 105, 110, 115, 120, 125, 130, 135 or 140 phr.

It is more preferable when di(2-ethylhexyl) terephthalate, di(2-ethylhexyl) adipate, pentaerythritol esterified with valeric acid or any desired mixture thereof is present in the coating composition according to the invention in a proportion of 0 to 110 phr, wherein the total proportion of one or more compounds of general formula (I), di(2-ethylhexyl) terephthalate, di(2-ethylhexyl) adipate, pentaerythritol esterified with valeric acid or any desired mixture thereof is not more than 120 phr. Thus the proportion of di(2-ethylhexyl) terephthalate, di(2-ethylhexyl) adipate, pentaerythritol esterified with valeric acid or any desired mixture thereof is for example 5, 10, 15, 20, 25, 30, 35, 50, 55, 60, 65, 70, 75, 80, 85, 90, 95, 100 or 105 phr.

It is particularly preferable when di(2-ethylhexyl) terephthalate, di(2-ethylhexyl) adipate, pentaerythritol esterified with valeric acid or any desired mixture thereof is present in the coating composition according to the invention in a proportion of 0 to 80 phr, wherein the total proportion of one or more compounds of general formula (I), di(2-ethylhexyl) terephthalate, di(2-ethylhexyl) adipate, pentaerythritol esterified with valeric acid or any desired mixture thereof is not more than 100 phr. Thus the proportion of di(2-ethylhexyl) terephthalate, di(2-ethylhexyl) adipate, pentaerythritol esterified with valeric acid or any desired mixture thereof is for example 5, 10, 15, 20, 25, 30, 35, 50, 55, 60, 65, 70 or 75 phr.

The coating composition according to the invention may further comprise one or more additives. Additives may be for example stabilizers, fillers, colorants, flame retardants, light stabilizers, blowing agents, polymeric processing aids, impact modifiers, optical brighteners, antistats or biostabilizers.

The additives described hereinbelow do not constitute a limitation to the coating composition according to the invention but serve merely to elucidate.

Stabilizers may be the customary polyvinyl chloride stabilizers in solid and liquid form such as Ca/Zn, Ba/Zn, Pb, Sn stabilizers, carbonates such as hydrotalcite, acid-binding phyllosilicates or mixtures thereof.

The proportion of stabilizers in the coating composition according to the invention is preferably 0.05 to 14 phr, more preferably 0.2 to 10 phr and particularly preferably 0.5 to 6 phr.

Fillers are generally used to positively influence the compressive strength, tensile strength and/or flexural strength, the hardness and/or the heat distortion temperature of the coating composition according to the invention.

Fillers that may be present in the coating composition according to the invention are for example carbon black and/or inorganic fillers. Inorganic fillers may be natural calcium carbonates, such as chalk, limestone, marble, synthetic calcium carbonates, dolomite, silicates, silica, sand, diatomaceous earth, aluminum silicates, such as kaolin, mica, feldspar, or any desired mixture of two or more of the abovementioned fillers.

The proportion of fillers in the coating composition according to the invention is preferably 0.01 to 150 phr, more preferably 1 to 100 phr and particularly preferably 1 to 80 phr.

Colorants may be used to adapt the coating composition according to the invention to different possible applications. Colorants may be pigments or dyes for example.

Pigments that may be present in the disclosed plastisol are for example inorganic and/or organic pigments. Inorganic pigments may be cobalt pigments such as $CoO/Al_2O_3$ and/or chromium pigments such as $Cr_2O_3$. Organic pigments may be monoazo pigments, condensed azo pigments, azomethine pigments, anthraquinone pigments, quinacridones, phthalocyanine pigments and/or dioxazine pigments.

The proportion of colorants in the coating composition according to the invention is preferably 0.01 to 20 phr, more preferably 0.1 to 10 phr and particularly preferably 0.2 to 6 phr.

Flame retardants can serve to reduce the flammability of the coating composition according to the invention and reduce smoke formation during combustion.

Flame retardants which may be present in the coating composition according to the invention may be for example antimony trioxide, chloroparaffin, phosphate esters, aluminum hydroxide and/or boron compounds.

The proportion of flame retardants in the coating composition according to the invention is preferably 0.01 to 20 phr, more preferably 0.1 to 10 phr and particularly preferably 0.2 to 6 phr.

Light stabilizers, such as UV absorbers, can serve to protect the coating composition according to the invention from damage due to the influence of light.

Light stabilizers may be for example hydroxybenzophenones, hydroxyphenylbenzotriazoles, cyanoacrylates, hindered amine light stabilizers such as derivatives of 2,2,6,6-tetramethylpiperidine or mixtures of the abovementioned compounds.

The proportion of light stabilizers in the coating composition according to the invention is preferably 0.01 to 14 phr, more preferably 0.04 to 8 phr and particularly preferably 1 to 3 phr.

The coating composition according to the invention is suitable for example for coating fabric fibers or the fabrics produced therefrom.

Fabric fibers may be natural fibers or synthetic fibers. If a fabric is made of natural fibers it is a natural fabric. If a fabric is made of synthetic fibers it is a synthetic fabric. If a fabric is made of natural and synthetic fibers it is a mixed fabric.

Natural fibers are for example cotton, linen, silk, wool, hemp or flax. Synthetic fibers are for example polyamide, such as PA 6 or PA 6.6, or polyester.

The coating composition according to the invention is preferably suitable for coating synthetic fibers or coating synthetic fabric or mixed fabric. The coating composition according to the invention is especially suitable for coating synthetic fabric.

The invention accordingly also provides a process for coating fabric fibers or fabric, preferably a process for coating synthetic fibers or for coating synthetic fabric or mixed fabric.

The process according to the invention comprises contacting at least one side of a fabric fiber or of a fabric with the coating composition according to the invention. The coating composition according to the invention may be contacted with at least one side of the fabric fiber or of the fabric by various processes, such as spread coating processes, curtain coating processes, dipping processes, printing processes, spraying processes, knife coating processes or calendaring processes.

Once at least one side of the fabric fiber or of the fabric has been contacted with the coating composition according to the invention the thus-coated fabric fiber or the thus-coated fabric may be treated at elevated temperature. An elevated temperature is for example a temperature of 140° C. to 210° C. Temperature and duration of treatment may be adapted by those skilled in the art to achieve a sufficient gelation and/or curing of the coating composition.

Further coatings of the coating composition according to the invention or of any desired other coating composition may be applied to the thus-obtained coatings.

The present invention also comprises articles comprising fabric, wherein the fabric is at least partially coated on one or more sides with the coating composition according to the invention.

Such articles are for example tarpaulins, conveyor belts, geomembranes, pond liners, flexible containers, tent sheets, awnings, floor coverings, such as carpets, artificial leather, roof or cladding materials or protective clothing.

The coating composition according to the invention features for example an extended pot life and/or a good mechanical adhesion to fabric fibers or fabric, in particular to synthetic fibers, synthetic fabric or mixed fabric. The extended pot life allows the coating composition according to the invention to be worked over a longer period.

Without wishing to be bound to theory it is thought that the use of one or more of the recited compounds having plasticizing properties has a positive influence on the polarity of the coating composition according to the invention. This results for example in an extended pot life and/or in a good mechanical adhesion to fabric fibers or fabric, in particular to synthetic fibers, synthetic fabric or mixed fabric.

The present invention provides for example the following preferred coating compositions.

Coating composition comprising:
a) polyvinyl chloride
b) one or more compounds of general formula (I),
c) one or more compounds of general formula (II),
d) one or more compounds of general formula (IV),
wherein the proportion of one or more compounds of general formula (I) is 5 to 150 phr, the proportion of one or more compounds of general formula (II) is 5 to 150 phr, the total proportion of compounds of general formula (I) and compounds of general formula (II) is 10 to 155 phr and the proportion of one or more compounds of general formula (IV) is 0.1 to 10 phr.

Coating composition comprising:
a) polyvinyl chloride,
b) di(isononyl) 1,2-cyclohexanedicarboxylate,
c) acetyl tri-n-butyl citrate, acetyl triisobutyl citrate or any desired mixture thereof,
d) one or more compounds of general formula (IV).

Coating composition comprising:
a) polyvinyl chloride,
b) di(isononyl) 1,2-cyclohexanedicarboxylate,
c) acetyl tri-n-butyl citrate, acetyl triisobutyl citrate or any desired mixture thereof,
d) one or more compounds of general formula (IV),
wherein the proportion of di(isononyl) 1,2-cyclohexanedicarboxylate is 5 to 150 phr, the proportion of acetyl tri-n-butyl citrate, acetyl triisobutyl citrate or any desired mixture thereof is 5 to 150 phr, the total proportion of di(isononyl) 1,2-cyclohexanedicarboxylate and acetyl tri-n-butyl citrate, acetyl triisobutyl citrate or any desired mixture thereof is 10 to 155 phr and the proportion of one or more compounds of general formula (IV) is 0.1 to 10 phr.

Coating composition comprising:
a) polyvinyl chloride,
b) di(isononyl) 1,2-cyclohexanedicarboxylate,
c) diethylene glycol dibenzoate, triethylene glycol dibenzoate, dipropylene glycol dibenzoate or any desired mixture thereof,
d) one or more compounds of general formula (IV).

Coating composition comprising:
e) polyvinyl chloride,
f) di(isononyl) 1,2-cyclohexanedicarboxylate,
g) diethylene glycol dibenzoate, triethylene glycol dibenzoate, dipropylene glycol dibenzoate or any desired mixture thereof,
h) one or more compounds of general formula (IV),
wherein the proportion of di(isononyl) 1,2-cyclohexanedicarboxylate is 5 to 150 phr, the proportion of diethylene glycol dibenzoate, triethylene glycol dibenzoate, dipropylene glycol dibenzoate or any desired mixture thereof is 5 to 150 phr, the total proportion of di(isononyl) 1,2-cyclohexanedicarboxylate and diethylene glycol dibenzoate, triethylene glycol dibenzoate, dipropylene glycol dibenzoate or any desired mixture thereof is 10 to 155 phr and the proportion of one or more compounds of general formula (IV) is 0.1 to 10 phr.

Any of the preceding coating compositions comprising one or more additives.

Any of the preceding coating compositions comprising one or more polymers distinct from polyvinyl chloride.

Any of the preceding coating compositions comprising one or more additives and one or more polymers distinct from polyvinyl chloride.

Any of the preceding coating compositions additionally comprising di(2-ethylhexyl) terephthalate, di(2-ethylhexyl) adipate, pentaerythritol esterified with valeric acid or any desired mixture thereof.

EXAMPLES

The invention is more particularly elucidated with reference to the figures described hereinbelow and the examples. The figures and examples are not to be understood as being limiting to the invention. The following input materials are used in the examples:

| Input materials | Commercially available for example | |
|---|---|---|
| | as | from |
| Homopolymeric emulsion PVC | Vinnolit ® P70 PS | Vinnolit GmbH & Co. KG, Germany |
| Homopolymeric emulsion PVC | Vestolit ® E7031 | Vestolit GmbH, Germany |
| Di(isononyl) 1,2-cyclohexanedicarboxylate | Hexamoll ® DINCH ® | BASF SE, Germany |
| Acetyl tributyl citrate | Citrofol ® BII | Jungbunzlauer Ladenburg GMBH, Germany |
| Mixture of 65% diethylene glycol dibenzoate, 20% dipropylene glycol dibenzoate and 15% triethylene glycol benzoate, | Benzoflex ® 2088 | Eastman Chemical bv, the Netherlands |
| Ba—Zn stabilizer | Baerostab ® UBZ 729 RF | Baerlocher Italia S.p.a, |
| Epoxidized linseed oil | Edenol ® B316 | Emery Oleochemicals GmbH |
| Chalk | Omya Industrie Spezial | Omya AG, Switzerland |
| Titanium dioxide | Kronos 2220 | Kronos Titanium GmbH, Germany |
| Isocyanurate, isocyanate-functionalized | Bonding Agent TP LXS 51099 | Lanxess Deutschland GmbH |

In all examples the employed homopolymeric emulsion PVC was Vinnolit® P70 PS and/or Vestolit® E7031, di(isononyl) 1,2-cyclohexanedicarboxylate was Hexamoll® DINCH®, acetyl tributyl citrate was Citrofol® BII, mixture of 65% diethylene glycol dibenzoate, 20% dipropylene glycol dibenzoate and 15% triethylene glycol benzoate was Benzoflex® 2088, Ba—Zn stabilizer was Baerostab® UBZ 729 RF, epoxidized linseed oil was Edenol® B316, chalk was Omya Industrie Spezial, isocyanate-functionalized isocyanurate was Bonding Agent TP LXS 51099 and titanium dioxide was Kronos 2220.

Hexamoll®DINCH®:

| Property | Typical value | Unit | Measurement method |
|---|---|---|---|
| Viscosity at 20° C. | 40-66 | mPA*s | ASTM D 7042-14 |
| Density at 20° C. | 0.944-0.954 | g/ml | DIN 51757 (01/11) |
| Acid number | not more than 0.07 | mg KOH/g | DIN EN ISO 2114 (06/02) |
| Refractive index $n^D{}_{20}$ | 1.460-1.466 at 20° C. | | DIN 51423/2 (02/10) |

Bonding Agent TP LXS 51099 according to datasheet (Technical Information 2011-08-09, page 1 to 3):

| Property | Typical value | Unit | Measurement method |
|---|---|---|---|
| Viscosity at 23° C. | about 6000 to 15 000 | mPA*s | DIN EN ISO 3219/A.3 Rotation |
| NCO content | 4-6 | % | DIN EN ISO 11909 (method based thereupon) |
| Monomer content (TDI) | <1 | % | DIN 55 956 |
| Flash point | 154 | ° C. | DIN EN ISO 2719 |

In the context of the examples Bonding Agent TP LXS 51099 is also referred to as an adhesion promoter.

TABLE 1

Composition of pastes; amounts in phr

| Components | #1* | #2 | #3 | #4* | #5 | #6 |
|---|---|---|---|---|---|---|
| Vinnolit ® P70 PS | 100 | 100 | 100 | | | |
| Vestolit ® E7031 | | | | 100 | 100 | 100 |
| Hexamoll ® DINCH ® | 70 | 52 | 52 | 70 | 52 | 52 |
| Citrofol ® BII | | 18 | | | 18 | |
| Benzoflex ® 2088 | | | 18 | | | 18 |
| Baerostab ® UBZ 729 RF | 3 | 3 | 3 | 3 | 3 | 3 |
| Edenol ® B316 | 3 | 3 | 3 | 3 | 3 | 3 |
| Omya Industrie Spezial | 20 | 20 | 20 | 20 | 20 | 20 |
| Kronos 2220 | 10 | 10 | 10 | 10 | 10 | 10 |
| Bonding Agent TP LXS 51099 | 8 | 8 | 8 | 8 | 8 | 8 |

*Comparative experiments, not inventive

The studies were in each case performed in the following five steps:
1. Production of base pastes
2. Modification of pastes with adhesion promoter
3. Rheological measurements of paste viscosity
4. Production of textile coatings
5. Measurement of peel force 1. Production of Base Pastes The batch size of the base coat pastes was 300 g. Hexamoll® DINCH® and Citrofol® BII or Hexamoll® DINCH® and Benzoflex® 2088, stabilizer (Baerostab® UBZ 729 RF) and co-stabilizer (Edenol® B316) were stirred into the initially charged blend of PVC, chalk and TiO2, and uniformly dispersed using a dissolver disk over about 5 min. The paste was subsequently ground in a laboratory roller mill (gap width 0.08/0.04 mm) and deaerated for 90-120 min. The thus-obtained base paste was allowed to mature overnight.

2. Modification of Pastes with Adhesion Promoter

A separated and weighed portion of the paste was admixed with the calculated amount of adhesion promoter (3.88 g/100 g). The thus-modified paste was deaerated for a further 30 min. Measurement of viscosity was followed by production of the coating samples which in turn was followed by another viscosity measurement.

3. Rheological Measurements of Paste Viscosity

The viscosity of all pastes was determined according to a fixed timing. Initially, i.e. immediately before addition of the adhesion promoter, a small amount of the base paste was in each case subjected to viscosity measurement. The pastes modified with adhesion promoter were measured 40 min and 200 min after adhesion promoter addition. To this end an MCR 300 modular compact rheometer (Anton Paar GmbH) fitted with a PP25 measuring system was used (plate-plate, radius 12.5 mm, gap width 0.2 mm). After temperature control of the sample (25° C.) the flow curve in the shear rate range of 1-1000 $s^{-1}$ was recorded. Viscosity values at 40 $s^{-1}$, 100 $s^{-1}$ and 490 $s^{-1}$ were obtained therefrom.

4. Production of Textile Coatings

Textile coating was carried out using a heat-set PES fabric (1100 dtex, 7/7 linen weave, 158 g/m$^2$). Coatings with the base coat pastes were carried out about 60 min after addition of the adhesion promoter. The samples were produced in an LTF Labcoater consisting of a laboratory spread coater having a tenter and a dryer (Werner Mathis AG).

To achieve double-sided coating of the PES fabric used here first coating of one side by the transfer method and subsequent direct coating of the other side has proven advantageous. A sheet of release paper (Stripkote BOR Supermatte, Arjo Wiggins Fine Papers Ltd.) was placed in the tenter and coated with base coat paste (knife coater gap width 0.3 mm). A cut-to-size fabric piece was then carefully laminated with the paste film. Fixing was carried out in the dryer at 160° C. (2 min). Base coat paste was then applied to the cooled top side (gap width 0.3 mm). Gelation of the composite was carried out at 190° C. (2 min). After cooling the sample was separated from the release paper. The basis weight of the samples is about 725 g/m$^2$.

5. Measurement of Peel Force

Testing of the adhesion/peel force was carried out according to DIN EN ISO 2411 (August 2000) ('rubber- or plastics-coated textiles—determination of adhesive bond strength of coatings'). To prepare the test specimens two respective samples die-cut from the samples were bonded together by the directly coated side with a 2K adhesive and stored under pressure. The actual test specimens having the specified dimensions were die-cut on the day of testing. The test specimens were prepared on the sixth day after sample preparation and tested on the seventh day. In a departure from the standard the peel force was measured on only three samples (longitudinally).

Results

TABLE 2

Viscosity values for PVC pastes (at 40 s-1, 100 s-1 and 490 s-1) and peel force of the coatings on PES fabric.

| | | Base paste | Paste modified with Bonding Agent TP LXS 51099 | | |
|---|---|---|---|---|---|
| Mixture | Shear rate [$s^{-1}$] | η [Pa s] | η after 40 min [Pa s] | η after 200 min [Pa s] | Peel force [N] |
| 1* | 40 | 1.6 | 13.6 | 17.5 | 27 |
| | 100 | 2.1 | 7.6 | 9.8 | |
| | 490 | 4.1 | 4.2 | 4.5 | |
| 2 | 40 | 1.9 | 2.7 | 4.2 | 35.9 |
| | 100 | 2.4 | 3.1 | 5.4 | |
| | 490 | 4.8 | 4.2 | 5.6 | |

TABLE 2-continued

Viscosity values for PVC pastes (at 40 s-1, 100 s-1 and 490 s-1) and peel force of the coatings on PES fabric.

| Mixture | Shear rate [s⁻¹] | Base paste η [Pa s] | Paste modified with Bonding Agent TP LXS 51099 | | Peel force [N] |
|---|---|---|---|---|---|
| | | | η after 40 min [Pa s] | η after 200 min [Pa s] | |
| 3 | 40 | 2.9 | 3.3 | 3.8 | 30 |
| | 100 | 4.4 | 5.1 | 6.2 | |
| | 490 | 8.7 | 8.6 | 9.4 | |
| 4* | 40 | 7.8 | 24.3 | 37.4 | 96 |
| | 100 | 5.6 | 13.7 | 20.6 | |
| | 490 | 3.3 | 6.2 | 7.2 | |
| 5 | 40 | 11 | 14.5 | 27.1 | 129 |
| | 100 | 7.6 | 9.4 | 16.1 | |
| | 490 | 4.5 | 5 | 6.7 | |
| 6 | 40 | 11.1 | 9.1 | 10 | 95 |
| | 100 | 84 | 7 | 7.6 | |
| | 490 | 5.7 | 5.1 | 5.3 | |

The coated fabrics produced from the inventive coating composition each have a markedly higher peel force than the coated fabrics based on the coating compositions from comparative experiments.

The inventive coating compositions are thus in each case advantageous in respect of pot life and the peel force of the coated fabrics produced therefrom compared to the noninventive coating compositions.

The invention claimed is:

1. A coating composition comprising
   a. polyvinyl chloride,
   b. one or more compounds of the formula (I), (I)

in which
$R^{1a}$ and $R^{1b}$ are independently of one another $C_9$-alkyl,
   c. a mixture of diethylene glycol dibenzoate, dipropylene glycol dibenzoate and triethylene glycol dibenzoate, and
   d. one or more compounds of the formula (IV), (IV)

wherein the proportion of the compound of the formula (I) is 5 to 150 phr, the proportion of the mixture of diethylene glycol dibenzoate, triethylene glycol dibenzoate, dipropylene glycol dibenzoate is 5 to 150 phr, and the proportion of one or more compounds of general formula (IV) is 0.1 to 10 phr.

2. The coating composition according to claim 1, wherein the one or more compounds of the formula (I) is di(isononyl) 1,2-cyclohexanedicarboxylate.

3. The coating composition according to claim 1, wherein the coating composition comprises one or more isocyanurates distinct from those of the formula (IV).

4. The coating composition according to claim 1, wherein the coating composition comprises one or more polymers distinct from polyvinyl chloride.

5. A process for producing a coating composition according to claim 1, comprising the following steps:
   a. suspending polyvinyl chloride in one or more compounds of the formula (I),
   b. adding one or more compounds of the formula (IV) to the suspension obtained in step a.,
wherein the mixture of diethylene glycol dibenzoate, dipropylene glycol dibenzoate and triethylene glycol dibenzoate, may be added in step a., or subsequent to step a. and prior to step b., in step b., or subsequent to step b., or at any time.

6. A process for coating fabric fibers or fabric, wherein one or more sides of the fabric fibers or of the fabric are contacted with the coating composition from claim 1.

7. The process according to claim 6, wherein the fabric is synthetic fabric.

8. An article comprising a fabric, wherein the fabric has been at least partially coated on one or more sides with the coating composition from claim 1.

9. The coating composition according to claim 1, wherein the proportion of the one or more compounds of the formula (IV) is 0.5 to 8 phr.

10. The coating composition according to claim 1, wherein the proportion of the one or more compounds of the formula (IV) is 1 to 6 phr.

11. The coating composition according to claim 2, wherein the proportion of the one or more compounds of the formula (IV) is 1 to 6 phr.

12. The coating composition according to claim 1, wherein the proportion of one or more compounds of general formula (I) is 20 to 100 phr, the proportion of the one or more compounds having plasticizing properties is 20 to 100 phr and the proportion of the one or more compounds of the formula (IV) is 1 to 6 phr.

13. The coating composition according to claim 12, wherein the one or more compounds of the formula (I) is di(isononyl) 1,2-cyclohexanedicarboxylate.

14. The coating composition according to claim 1, which consists essentially of
   a) polyvinyl chloride,
   b) di(isononyl) 1,2-cyclohexanedicarboxylate,
   c) the mixture of diethylene glycol dibenzoate, dipropylene glycol dibenzoate and triethylene glycol dibenzoate
   d) one or more compounds of general formula (IV),
   wherein the proportion of di(isononyl) 1,2-cyclohexanedicarboxylate is 20 to 100 phr, the proportion of mixture of diethylene glycol dibenzoate, dipropylene glycol dibenzoate and triethylene glycol dibenzoate is 20 to 100 phr, the total proportion of di(isononyl) 1,2-cyclohexanedicarboxylate and the mixture of diethylene glycol dibenzoate, dipropylene glycol dibenzoate and triethylene glycol dibenzoate is 40 to 120 phr and the proportion of one or more compounds of general formula (IV) is 1 to 6 phr.

* * * * *